(12) United States Patent
Chen (10) Patent No.: US 7,498,791 B2
(45) Date of Patent: Mar. 3, 2009

(54) REVERSE CURRENT PREVENTING CIRCUIT AND METHOD

(75) Inventor: Tien-Tzu Chen, Hsinchu (TW)

(73) Assignee: Global Mixed-mode Technology Inc., Hsinchu (TW)

( * ) Notice: Subject to any disclaimer, the term of this patent is extended or adjusted under 35 U.S.C. 154(b) by 344 days.

(21) Appl. No.: 11/457,453

(22) Filed: Jul. 13, 2006

(65) Prior Publication Data

US 2008/0012540 A1 Jan. 17, 2008

(51) Int. Cl.
*G05F 1/00* (2006.01)
*G05F 3/16* (2006.01)

(52) U.S. Cl. .................... 323/284; 323/271; 323/224

(58) Field of Classification Search .............. 323/222, 323/224, 225, 268, 271, 282, 283, 284, 285, 323/286, 287; 363/50, 55, 56.01, 56.02
See application file for complete search history.

(56) References Cited

U.S. PATENT DOCUMENTS

| 5,481,178 | A | 1/1996 | Wilcox et al. | |
|---|---|---|---|---|
| 6,396,250 | B1 | 5/2002 | Bridge | |
| 6,538,418 | B2 | 3/2003 | Miyazaki | |
| 6,541,947 | B1 | 4/2003 | Dittmer et al. | |
| 6,707,281 | B2 | 3/2004 | Solivan | |
| 6,815,939 | B2 | 11/2004 | Umemoto et al. | |
| 6,870,354 | B2 | 3/2005 | Nishimaki | |
| 6,873,140 | B2 * | 3/2005 | Saggini et al. | 323/283 |
| 2006/0113980 | A1 * | 6/2006 | Yoshida | 323/282 |
| 2006/0164057 | A1 * | 7/2006 | Kudo et al. | 323/282 |

OTHER PUBLICATIONS

Steve Mappus, "Predictive Gate Drive Boosts Synchronous DC/DC Power Converter Efficiency", Apr. 2003, pp. 1-26, SLUA281, Texas Instruments Incorporated, Dallas, Texas.

* cited by examiner

*Primary Examiner*—Akm E Ullah
*Assistant Examiner*—M'Baye Diao
(74) *Attorney, Agent, or Firm*—Winston Hsu (57) ABSTRACT

A synchronous switching voltage converter has a first switch, a second switch, and an inductor, which are all coupled together to a switch node. A reverse current preventing circuit has a current detecting circuit, a voltage detecting circuit, a delay time adjusting circuit, and a blocking circuit. When an inductor current reduces to reach a predetermined threshold current, the current detecting circuit generates an original preventing signal. The voltage detecting circuit detects a switch voltage at the switch node. In response to the original preventing signal, the delay time adjusting circuit generates a corrected preventing signal after an adjustable delay time with respect to the original preventing signal. The adjustable delay time is adjusted on a basis of the switch voltage. In response to the corrected preventing signal, the blocking circuit turns OFF the second switch.

16 Claims, 6 Drawing Sheets

REVERSE CURRENT PREVENTING CIRCUIT AND METHOD

BACKGROUND OF THE INVENTION

1. Field of the Invention

The present invention relates to a reverse current preventing circuit and, more particularly, to a reverse current preventing circuit, which is applied in a synchronous switching voltage converter, for accurately preventing occurrence of current reversal.

2. Description of the Related Art

Figure 1A:
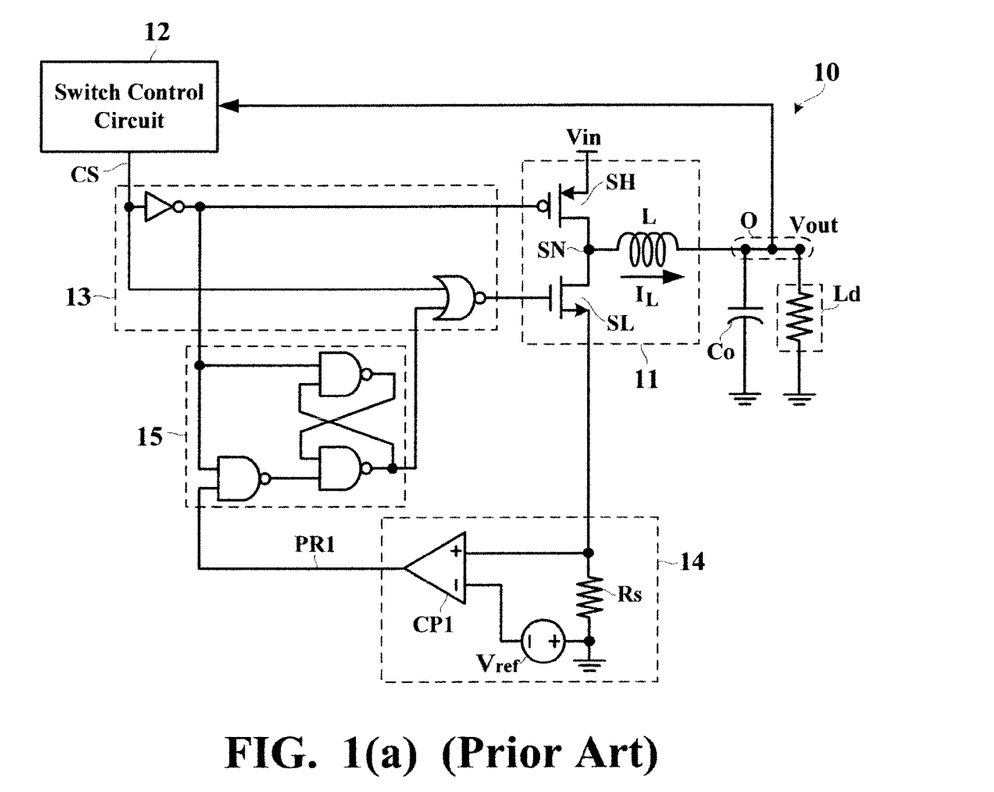
FIG. 1(a) is a circuit diagram showing a conventional synchronous switching voltage converter.

FIG. 1($a$) is a circuit diagram showing a conventional synchronous switching voltage converter 10. The synchronous switching voltage converter 10 converts an input voltage $V_{in}$ into a regulated output voltage $V_{out}$ for being supplied to a load Ld. A high-side switch SH is coupled between the input voltage $V_{in}$ and a switch node SN, while a low-side switch SL is coupled between the switch node SN and a ground potential. In the example shown in FIG. 1($a$), the high-side switch SH is implemented by a PMOS transistor while the low-side switch SL is implemented by an NMOS transistor. An inductor L is coupled between the switch node SN and an output terminal O. A switch control circuit 12 generates a switch control signal CS, such as a pulse-width-modulation signal, for determining whether to turn ON/OFF the high-side switch SH and the low-side switch SL. In response to the feedback of the output voltage $V_{out}$, the switch control circuit 12 adjusts the duty cycle of the switch control signal CS so as to regulate the output voltage $V_{out}$. Furthermore, an output capacitor $C_o$ is coupled to the output terminal O so as to filter ripples of the output voltage $V_{out}$.

Figure 1B:
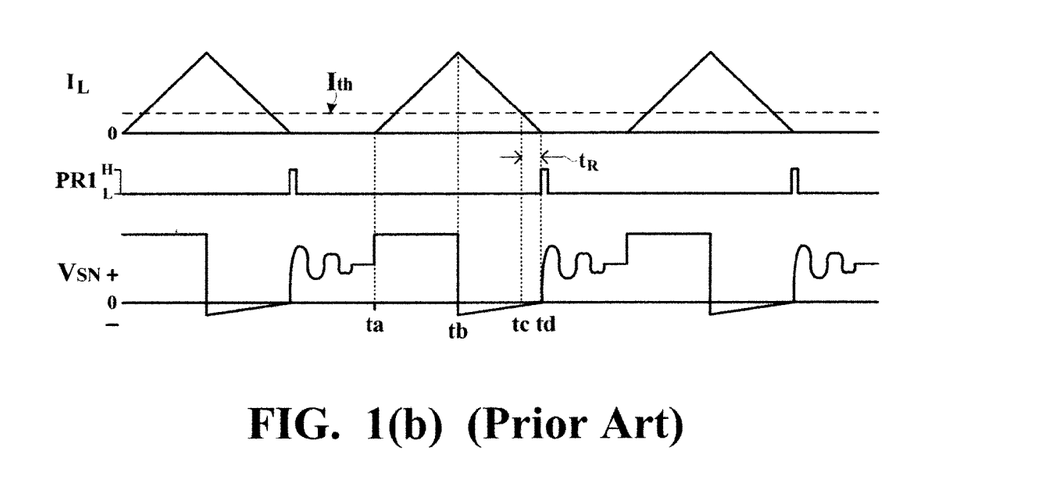
FIG. 1(b) is a waveform timing diagram showing an ideal operation of a conventional synchronous switching voltage converter.

FIG. 1($b$) is a waveform timing diagram showing an ideal operation of a conventional synchronous switching voltage converter 10. During time ta to tb, the high-side switch SH is turned ON and the low-side switch SL is turned OFF, such that an inductor current $I_L$ flows from the input voltage $V_{in}$ through the high-side switch SH to the output terminal O and gradually increases. In this case, a switch voltage $V_{SN}$ at the switch node SN is pulled up to the input voltage $V_{in}$. At time tb, the high-side switch SH is turned OFF and the low-side switch SL is turned ON, such that the inductor current $I_L$ flows from the ground potential through the low-side switch SL to the output terminal O and gradually decreases. In this case, the switch voltage $V_{SN}$ at the switch node SN is abruptly pulled down below the ground potential. When the inductor current $I_L$ decreases to reach a predetermined threshold current $I_{th}$, i.e. at time tc, a potential difference across a sensing resistor $R_S$ caused by the inductor current $I_L$ becomes smaller than a reference voltage source $V_{ref}$. As a result, the potential received at a non-inverting input terminal of a comparator CP1 is larger than the potential received at an inverting input terminal thereof. Because the comparator CP1 has a response time $t_R$ due to a finite speed of practical operation, it is necessary to wait until time td for a prevention signal PR1 to be changed from the low level L to the high level H at the output of the comparator CP1, wherein (td−tc)=$t_R$. In response to the high level H of the prevention signal PR1 output from the comparator CP1, a blocking circuit 15 outputs a low level signal to turn OFF the low-side switch SL. Ideally, the moment when the blocking circuit 15 turns OFF the low-side switch SL is arranged at the event that the inductor current $I_L$ just reduces to zero, i.e. at time td, so as to prevent the inductor current $I_L$ from reversing the direction. In order to achieve such an ideal effect, the decreasing rate of the inductor current $I_L$ and the response time $t_R$ of the comparator CP1 should be precisely predicted so as to determine an appropriate threshold current $I_{th}$.

Figure 2A:
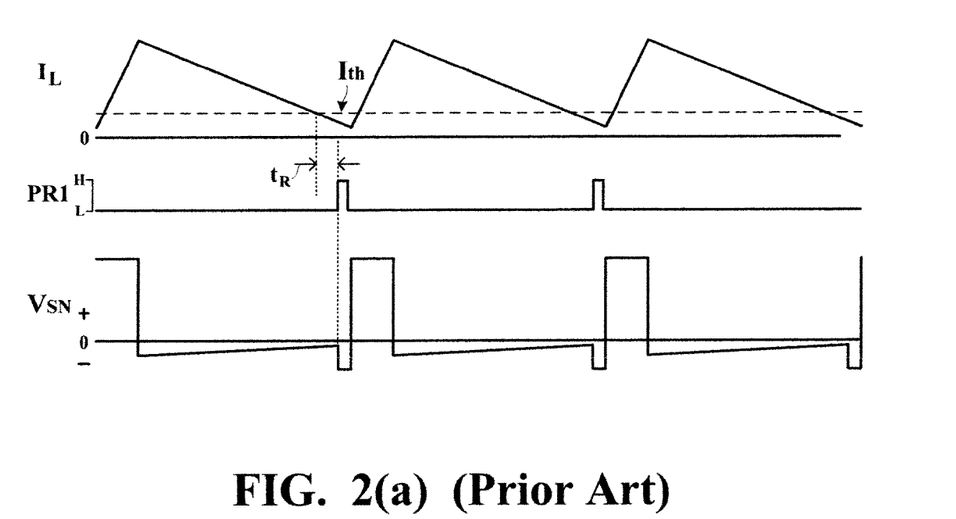
FIG. 2(a) is a waveform timing diagram showing a practical operation of a conventional synchronous switching voltage converter.
Figure 2B:
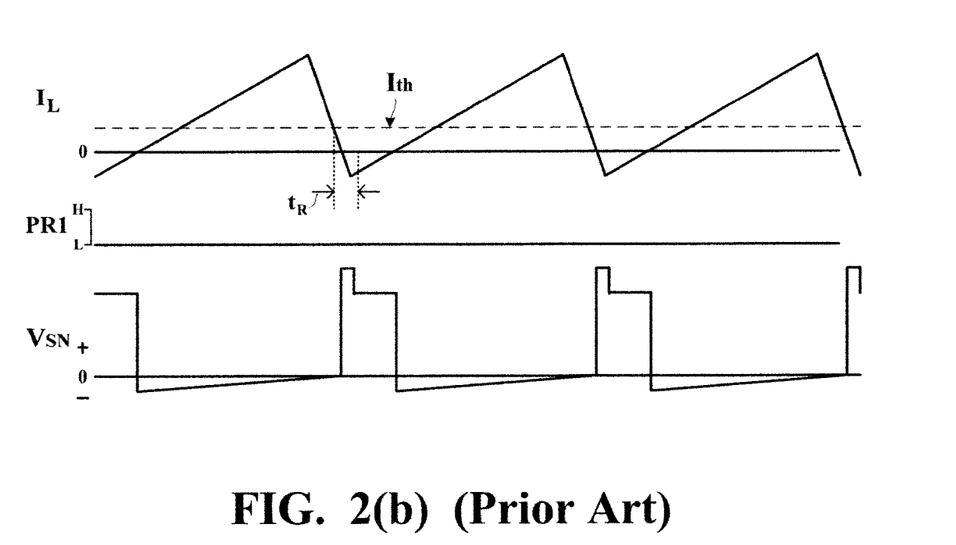
FIG. 2(b) is a waveform timing diagram showing a practical operation of a conventional synchronous switching voltage converter.

However, the decreasing rate of the inductor current $I_L$ is proportional to the output voltage $V_{out}$ and is inversely proportional to the inductor L. It is assumed that the threshold current $I_{th}$ is kept constant after manufacturing. If the decreasing rate of the inductor current $I_L$ is relatively too slow, the inductor current $I_L$ has not yet reduced to zero at the moment when the low-side switch SL is turned OFF, as shown in FIG. 2($a$). If the decreasing rate of the inductor current $I_L$ is relatively too fast, the inductor current $I_L$ has already reversed the direction at the moment when the low-side switch SL is turned OFF, as shown in FIG. 2($b$). In these two cases, the operational efficiency of the synchronous switching voltage converter 10 is subjected to deterioration.

Figure 3A:
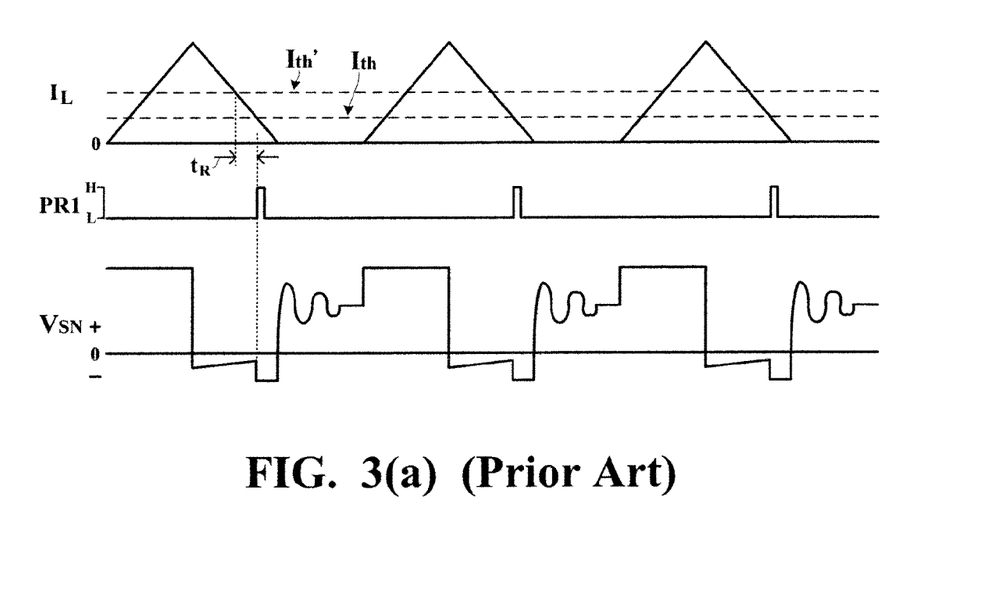
FIG. 3(a) is a waveform timing diagram showing a practical operation of a conventional synchronous switching voltage converter.
Figure 3B:
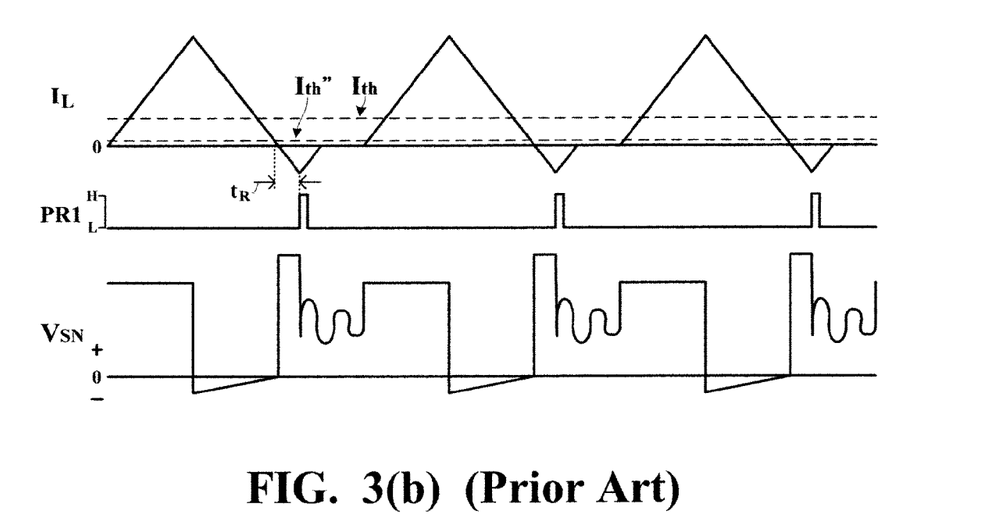
FIG. 3(b) is a waveform timing diagram showing a practical operation of a conventional synchronous switching voltage converter.

Moreover, the threshold current $I_{th}$ is, as a matter of fact, subjected to variation along with processing parameter shift and operational temperature change. If the threshold current $I_{th}$ moves up to become a larger threshold current $I_{th}'$, as shown in FIG. 3($a$), the low-side switch SL has already been turned OFF before the inductor current $I_L$ reduces to zero. If the threshold current $I_{th}$ moves down to become a smaller threshold current $I_{th}''$, as shown in FIG. 3($b$), the low-side switch SL has not yet been turned OFF at the moment when the inductor current $I_L$ reverses the direction. In these two cases, the operational efficiency of the synchronous switching voltage converter 10 is subjected to deterioration.

SUMMARY OF THE INVENTION

In view of the above-mentioned problems, an object of the present invention is to provide a reverse current preventing circuit, which is applied in a synchronous switching voltage converter, for accurately preventing the occurrence of current reversal even though the output voltage, the inductor, the processing parameter, and the temperature are subjected to variations.

According to one aspect of the present invention, a reverse current preventing circuit is applied in a synchronous switching voltage converter. The synchronous switching voltage converter has a first switch, a second switch, and an inductor, three of which are coupled together to a switch node. When the first switch is turned ON and the second switch is turned OFF, an inductor current flowing through the inductor increases. When the first switch is turned OFF and the second switch is turned ON, the inductor current decreases. The reverse current preventing circuit includes a current detecting circuit, a voltage detecting circuit, a delay time adjusting circuit, and a blocking circuit. The current detecting circuit detects the inductor current such that the current detecting circuit generates an original prevention signal when the inductor current reduces to reach a predetermined threshold current. The voltage detecting circuit detects a switch voltage at the switch node. The delay time adjusting circuit generates a corrected prevention signal in response to the original prevention signal. The corrected prevention signal is output after an adjustable delay time with respect to the original prevention signal. The adjustable delay time is adjusted on a basis of the switch voltage at the switch node. In response to the corrected prevention signal, the blocking circuit turns OFF the second switch of the synchronous switching voltage converter.

According to another aspect of the present invention, a reverse current preventing method is applied in a synchronous switching voltage converter. The synchronous switching voltage converter has a first switch, a second switch, and an inductor, three of which are coupled together to a switch node. When the first switch is turned ON and the second switch is turned OFF, an inductor current flowing through the inductor increases. When the first switch is turned OFF and the second switch is turned ON, the inductor current decreases. The reverse current preventing method includes the following steps. The inductor current is detected. An original prevention signal is generated when the inductor current reduces to reach a predetermined threshold current. A switch voltage at the switch node is detected. A corrected prevention signal is generated in response to the original prevention signal, such that the corrected prevention signal is output after an adjustable delay time with respect to the original prevention signal. The adjustable delay time is adjusted on a basis of the switch voltage at the switch node. The second switch of the synchronous switching voltage converter is turned OFF in response to the corrected prevention signal.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 4:
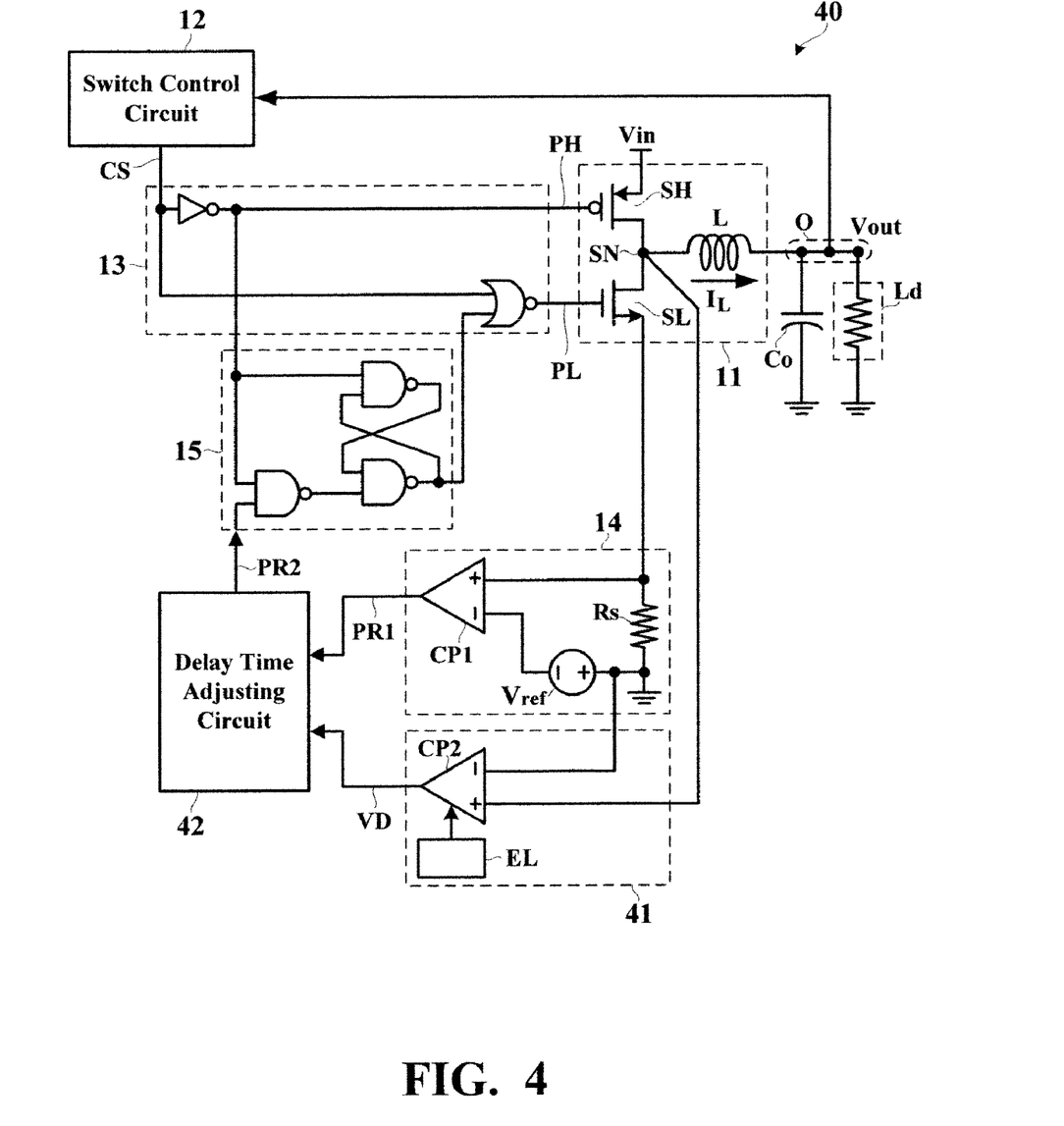
FIG. 4 is a circuit diagram showing a synchronous switching voltage converter according to the present invention.

FIG. 4 is a circuit diagram showing a synchronous switching voltage converter 40 according to the present invention. More specifically, the synchronous switching voltage converter 40 has a synchronous switching circuit 11, a switch control circuit 12, a drive circuit 13, a current detecting circuit 14, a blocking circuit 15, a voltage detecting circuit 41, and a delay time adjusting circuit 42. The synchronous switching voltage converter 40 converts an input voltage $V_{in}$ into a regulated output voltage $V_{out}$ for being supplied to a load Ld. The synchronous switching circuit 11 has a high-side switch SH, a low-side switch SL, and an inductor L. The high-side switch SH is coupled between the input voltage $V_{in}$ and a switch node SN, while the low-side switch SL is coupled between the switch node SN and a ground potential. In the example shown in FIG. 4, the high-side switch SH is implemented by a PMOS transistor while the low-side switch SL is implemented by an NMOS transistor. An inductor L is coupled between the switch node SN and an output terminal O. A switch control circuit 12 generates a switch control signal CS, such as a pulse-width-modulation signal. Through the drive circuit 13, the switch control signal CS is transformed into a high-side drive signal PH and a low-side drive signal PL for determining whether to turn ON/OFF the high-side switch SH and the low-side switch SL, respectively. In response to the feedback of the output voltage $V_{out}$, the switch control circuit 12 adjusts the duty cycle of the switch control signal CS so as to regulate the output voltage $V_{out}$. Furthermore, an output capacitor $C_o$ is coupled to the output terminal O so as to filter ripples of the output voltage $V_{out}$.

The synchronous switching voltage converter 40 according to the present invention is different from the conventional synchronous switching voltage converter 10 in that the synchronous switching voltage converter 40 according to the present invention is provided with the voltage detecting circuit 41 and the delay time adjusting circuit 42. More specifically, a reverse current preventing circuit according to the present invention is constructed by the current detecting circuit 14, the blocking circuit 15, the voltage detecting circuit 41, and the delay time adjusting circuit 42.

The current detecting circuit 14 has a sensing resistor $R_S$, a reference voltage source $V_{ref}$, and a comparator CP1. The sensing resistor $R_S$ is coupled in series between the low-side switch SL and the ground potential. The reference voltage source $V_{ref}$ is a representative of a predetermined threshold current $I_{th}$. The comparator CP1 has a non-inverting input terminal and an inverting input terminal. The non-inverting input terminal is coupled to a connecting point between the sensing resistor $R_S$ and the low-side switch SL, while the inverting input terminal is coupled to the ground potential through the reference voltage source $V_{ref}$. The voltage detecting circuit 41 is implemented by a comparator CP2 and an enabling circuit EL. The comparator CP2 has a non-inverting input terminal and an inverting input terminal. The non-inverting input terminal is coupled to the switch node SN, while the inverting input terminal is coupled to the ground potential. The enabling circuit EL controls the comparator CP2, such that the comparator CP2 is disabled when the high-side switch SH is turned ON but is enabled when the high-side switch SH is turned OFF.

When the inductor current $I_L$ reduces to reach the predetermined threshold current $I_{th}$, the current detecting circuit 14 generates an original prevention signal PR1. Through the delay time adjusting circuit 42, the original prevention signal PR1 is adjusted to become a corrected prevention signal PR2. The corrected prevention signal PR2 is generated after an adjustable delay time $t_{adj}$ with respect to the original prevention signal PR1. In response to the corrected prevention signal PR2, the blocking circuit 15 turns OFF the low-side switch SL so as to prevent the occurrence of current reversal. Such adjustable delay time $t_{adj}$ is determined by the delay time adjusting circuit 42 on the basis of the switch voltage $V_{SN}$ at the switch node SN detected by the voltage detecting circuit 41. If the switch voltage $V_{SN}$ at the switch node SN is smaller than zero at the moment when the blocking circuit 15 turns OFF the low-side switch SL, which indicates the inductor current $I_L$ has not yet reduced to zero, the adjustable delay time $t_{adj}$ must be prolonged such that the corrected prevention signal PR2 is generated at a later time. If the switch voltage $V_{SN}$ at the switch node SN is larger than zero at the moment when the blocking circuit 15 turns OFF the low-side switch SL, which indicates the inductor current $I_L$ has reversed the direction, the adjustable delay time $t_{adj}$ must be shortened such that the corrected prevention signal PR2 is generated at an earlier time.

Figure 5:
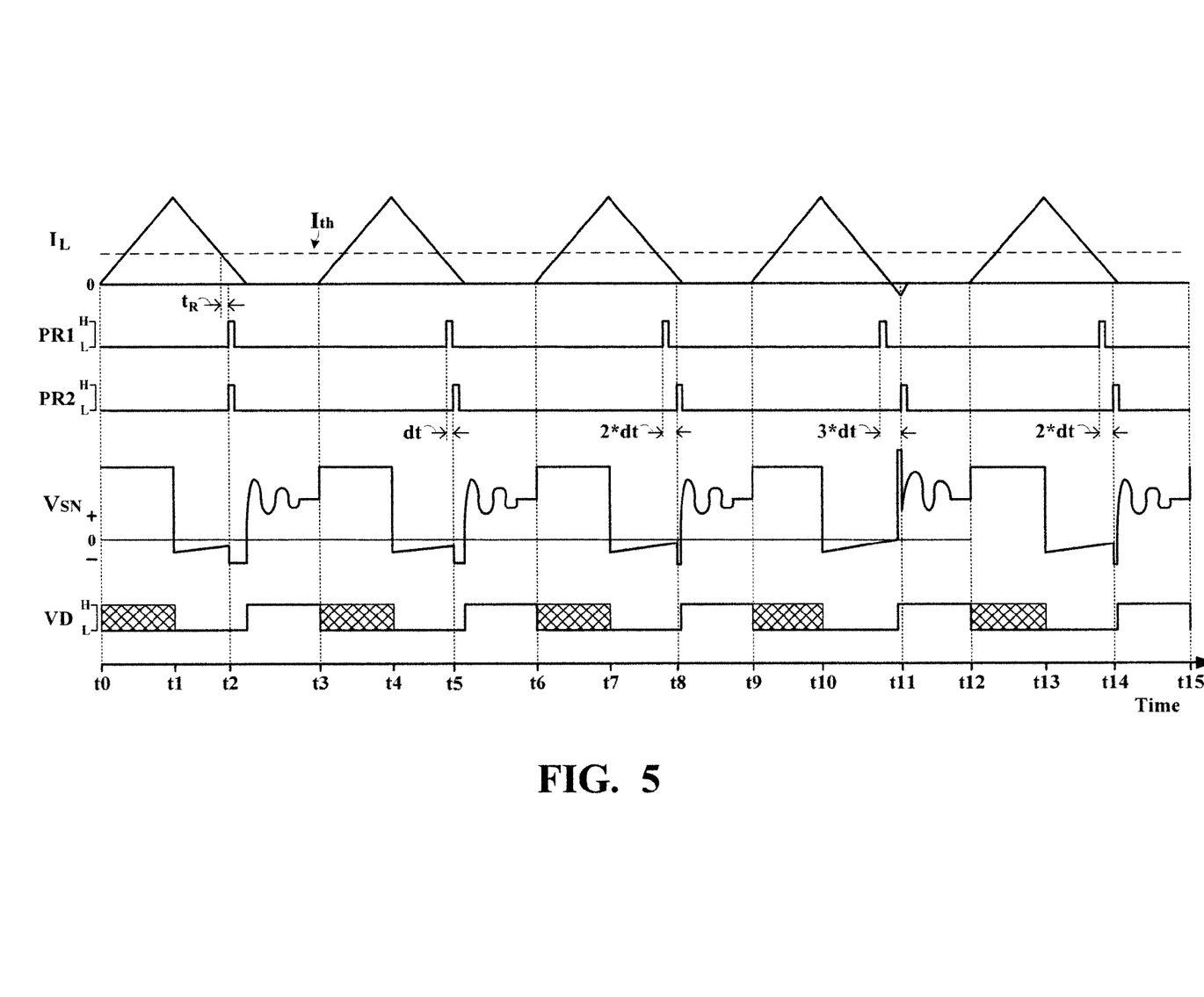
FIG. 5 is a waveform timing diagram showing a practical operation of a synchronous switching voltage converter according to the present invention.

Hereinafter is described in detail an operation of the synchronous switching voltage converter 40 according to the present invention with reference to FIG. 5. During time t0 to t1, the inductor current $I_L$ gradually increases and the voltage detecting circuit 41 is disabled because the high-side switch SH is turned ON and the low-side switch SL is turned OFF. From time t1 on, the inductor current $I_L$ gradually decreases because the high-side switch SH is turned OFF and the low-side switch SL is turned ON. The voltage detecting circuit 41 is enabled to detect the switch voltage $V_{SN}$ at the switch node SN and to generate the voltage detection signal VD. After the response time $t_R$ since the inductor current $I_L$ reduces to reach the threshold current $I_{th}$, the original prevention signal PR1 transitions to the high level H. It is assumed that the adjustable delay time $t_{adj}$ is set as zero during the first period from time t0 to t3, and therefore the corrected prevention signal PR2 transitions to the high level H at the same time as the original prevention signal PR1, i.e. at time t2. The high level H of the corrected prevention signal PR2 indicates the very moment to turn OFF the low-side switch SL. However, the switch voltage $V_{SN}$ at the switch node SN is smaller than zero at time t2, indicating that the inductor current $I_L$ has not yet reduced to zero. In other words, the voltage detection signal VD of the first period is at the low level L at the moment when the low-side switch SL is turned OFF. In response to the low level L of the voltage detection signal VD, the delay time adjusting circuit 42 prolongs the adjustable delay time $t_{adj}$ from zero to dt, for being applied to the next period.

During the second period from t3 to t6, the original prevention signal PR1 transitions to the high level H after the response time $t_R$ since the inductor current $I_L$ reduces to reach the threshold current $I_{th}$. Because the adjustable delay time $t_{adj}$ has been prolonged to dt after the first period, the corrected prevention signal PR2 of the second period transitions to the high level H at time t5, which is later by dt than the original prevention signal PR1. At time t5, the switch voltage $V_{SN}$ at the switch node SN is smaller than zero, indicating that the inductor current $I_L$ has not yet reduced to zero. In other words, the voltage detection signal VD of the second period is at the low level L at the moment when the low-side switch SL is turned OFF. In response to the low level L of the voltage detection signal VD, the delay time adjusting circuit 42 further prolongs the adjustable delay time $t_{adj}$ from dt to 2*dt, for being applied to the next period.

During the third period from t6 to t9, the original prevention signal PR1 transitions to the high level H after the response time $t_R$ since the inductor current $I_L$ reduces to reach the threshold current $I_{th}$. Because the adjustable delay time $t_{adj}$ has been prolonged to 2*dt after the second period, the corrected prevention signal PR2 of the third period transitions to the high level H at time t8, which is later by 2*dt than the original prevention signal PR1. At time t8, the switch voltage $V_{SN}$ at the switch node SN is smaller than zero, indicating that the inductor current $I_L$ has not yet reduced to zero. In other words, the voltage detection signal VD of the third period is at the low level L at the moment when the low-side switch SL is turned OFF. In response to the low level L of the voltage detection signal VD, the delay time adjusting circuit 42 further prolongs the adjustable delay time $t_{adj}$ from 2*dt to 3*dt, for being applied to the next period.

During the fourth period from t9 to t12, the original prevention signal PR1 transitions to the high level H after the response time $t_R$ since the inductor current $I_L$ reduces to reach the threshold current $I_{th}$. Because the adjustable delay time $t_{adj}$ has been prolonged to 3*dt after the third period, the corrected prevention signal PR2 of the fourth period transitions to the high level H at time t11, which is later by 3*dt than the original prevention signal PR1. At time t11, the switch voltage $V_{SN}$ at the switch node SN is larger than zero, indicating that the inductor current $I_L$ has reversed the direction. In other words, the voltage detection signal VD of the fourth period is at the high level H at the moment when the low-side switch SL is turned OFF. In response to the high level H of the voltage detection signal VD, the delay time adjusting circuit 42 shortens the adjustable delay time $t_{adj}$ from 3*dt to 2*dt, for being applied to the next period.

During the fifth period from t12 to t15, the original prevention signal PR1 transitions to the high level H after the response time $t_R$ since the inductor current $I_L$ reduces to reach the threshold current $I_{th}$. Because the adjustable delay time $t_{adj}$ has been shortened to 2*dt after the fourth period, the corrected prevention signal PR2 of the fifth period transitions to the high level H at time t14, which is later by 2*dt than the original prevention signal PR1. At time t14, the switch voltage $V_{SN}$ at the switch node SN is smaller than zero, indicating that the inductor current $I_L$ has not yet reduced to zero. In other words, the voltage detection signal VD of the fifth period is at the low level L at the moment when the low-side switch SL is turned OFF. In response to the low level L of the voltage detection signal VD, the delay time adjusting circuit 42 prolongs the adjustable delay time $t_{adj}$ from 2*dt to 3*dt, for being applied to the next period.

As a matter of fact, the operation of the fifth period is identical to the operation of the third period, both of which have the same adjustable delay time $t_{adj}$ of 2*dt. Therefore, the operation of the sixth period (not shown) will be identical to the operation of the fourth period, both of which have the same adjustable delay time $t_{adj}$ of 3*dt. In other words, the adjustable delay time $t_{adj}$ finally converges to oscillate back and forth between 2*dt and 3*dt. Therefore, the reverse current preventing circuit according to the present invention effectively achieves an accurate rate within a range of one dt for preventing the occurrence of current reversal.

Figure 6:
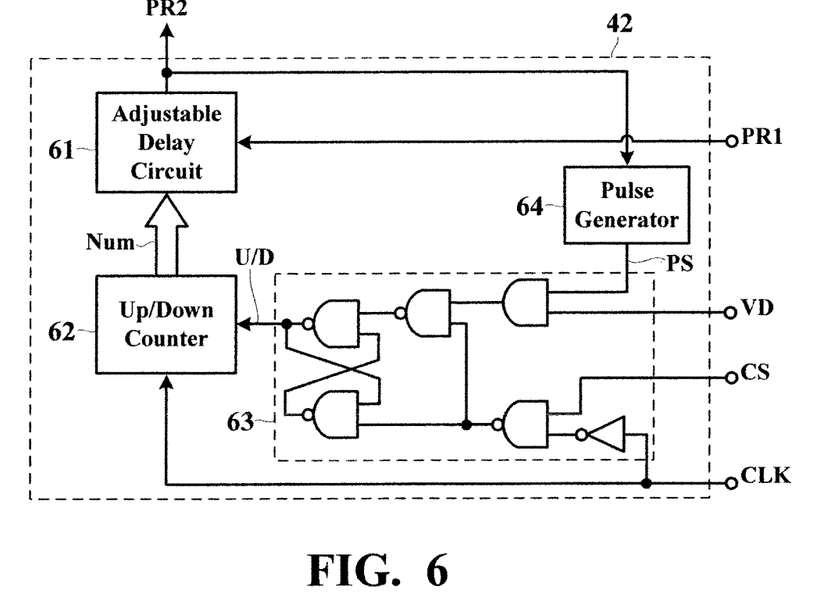
FIG. 6 is a detailed circuit diagram showing an example of a delay time adjusting circuit according to the present invention.

FIG. 6 is a detailed circuit diagram showing an example of a delay time adjusting circuit 42 according to the present invention. Referring to FIG. 6, the delay time adjusting circuit 42 has an adjustable delay circuit 61, an up/down counter 62, an up/down determining circuit 63, and a pulse generator 64. The adjustable delay circuit 61 receives the original prevention signal PR1, and outputs the corrected prevention signal PR2 after the adjustable delay time $t_{adj}$. The adjustable delay time $t_{adj}$ provided by the adjustable delay circuit 61 is determined on the basis of the count signal Num generated by the up/down counter 62. In response to the up/down signal U/D generated by the up/down determining circuit 63, the up/down counter 62 increments or decrements the count signal Num. The pulse generator 64 is triggered by the corrected prevention signal PR2 to generate a pulse signal PS. In response to the pulse signal PS, the up/down determining circuit 63 retrieves the state of the voltage detection signal VD to generate the up/down signal U/D. When the state of the voltage detection signal VD is at the low level L, the up/down signal U/D causes the up/down counter 62 to increment the count signal Num. When the state of the voltage detection signal VD is at the high level H, the up/down signal U/D causes the up/down counter 62 to decrement the count signal Num. The clock signal CLK is applied to the up/down counter 62, and the switch control signal CS and the clock signal CLK are applied to the up/down determining circuit 63, for providing refreshment at each period.

Figure 7:
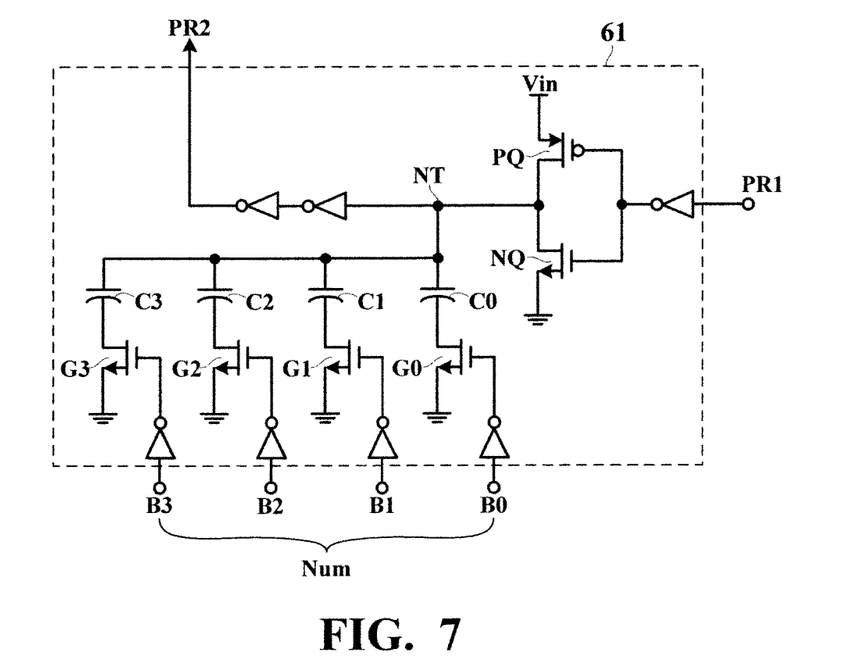
FIG. 7 is a detailed circuit diagram showing an example of an adjustable delay circuit according to the present invention.

FIG. 7 is a detailed circuit diagram showing an example of an adjustable delay circuit 61 according to the present invention. In the embodiment shown in FIG. 7, the count signal Num is assumed to be a four-bit signal [B3, B2, B1, B0]. A PMOS transistor PQ and an NMOS transistor NQ are coupled together to form a charge/discharge switch, which is controlled by the original prevention signal PR1. When the original prevention signal PR1 transitions from the low level L to the high level H, the transistor PQ is turned ON and the transistor NQ is turned OFF, such that the input voltage $V_{in}$ charges the delay node NT. When the original prevention signal PR1 transitions from the high level H to the low level L, the transistor PQ is turned OFF and the transistor NQ is turned ON, such that the delay node NT is discharged to the ground potential. The voltage at the delay node NT is output through two inverters to serve as the corrected prevention signal PR2.

When the bit B0=0, a switch transistor G0 is turned ON such that the delay node NT is coupled through a capacitor C0 to the ground potential; when the bit B0=1, the switch transistor G0 is turned OFF such that the delay node NT is decoupled from the capacitor C0. When the bit B1=0, a switch transistor G1 is turned ON such that the delay node NT is coupled through a capacitor C1 to the ground potential; when the bit B1=1, the switch transistor G1 is turned OFF such that the delay node NT is decoupled from the capacitor C1. When the bit B2=0, a switch transistor G2 is turned ON such that the delay node NT is coupled through a capacitor C2 to the ground potential; when the bit B2=1, the switch transistor G2 is turned OFF such that the delay node NT is decoupled from the capacitor C2. When the bit B3=0, a switch transistor G3 is turned ON such that the delay node NT is coupled through a capacitor C3 to the ground potential; when the bit B3=1, the switch transistor G3 is turned OFF such that the delay node NT is decoupled from the capacitor C3.

The charging/discharging time of the delay node NT is determined on the basis of the capacitance coupled to the delay node NT. When the capacitance coupled to the delay node NT becomes higher, the charging/discharging time of the delay node NT becomes longer, such that the adjustable delay time $t_{adj}$ of the corrected prevention signal PR2 with respect to the original prevention signal PR1 becomes longer. For this reason, the four capacitors [C3, C2, C1, C0] may be designed to provide capacitances [8*C0, 4*C0, 2*C0, C0]. Each time when the count number Num increments by 1, the capacitance coupled to the delay node NT correspondingly decreases by C0, which causes the adjustable delay time $t_{adj}$ to be correspondingly shortened by a fixed amount, such as one dt shown in FIG. 5. Each time when the count number Num decrements by 1, the capacitance coupled to the delay node NT correspondingly increases by C0, which causes the adjustable delay time $t_{adj}$ to be correspondingly prolonged by a fixed amount, such as one dt shown in FIG. 5.

It should be noted that although the above-described embodiments refer only to the synchronous buck type switching voltage converter, the reverse current preventing circuit according to the present invention may also be applied to a synchronous boost type switching voltage converter and any of other types of synchronous switching voltage converters.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A reverse current preventing circuit, applied in a synchronous switching voltage converter having a first switch, a second switch, and an inductor, three of which are coupled together to a switch node, such that an inductor current flowing through the inductor increases when the first switch is turned ON and the second switch is turned OFF, and the inductor current decreases when the first switch is turned OFF and the second switch is turned ON, the reverse current preventing circuit comprising:

a current detecting circuit for detecting the inductor current such that the current detecting circuit generates an original prevention signal when the inductor current reduces to reach a predetermined threshold current;

a voltage detecting circuit for detecting a switch voltage at the switch node, wherein the voltage detecting circuit is implemented by a first comparator and an enabling circuit, and the enabling circuit is used to control the first comparator such that the first comparator is disabled when the first switch is turned ON but is enabled when the first switch is turned OFF;

a delay time adjusting circuit for generating a corrected prevention signal in response to the original prevention signal, such that the corrected prevention signal is output after an adjustable delay time with respect to the original prevention signal, the adjustable delay time being adjusted on a basis of the switch voltage at the switch node; and a blocking circuit for turning OFF the second switch of the synchronous switching voltage converter in response to the corrected prevention signal.

2. The circuit according to claim 1, wherein:

when the voltage detecting circuit detects that the switch voltage at the switch node has a first polarity, the delay time adjusting circuit shortens the adjustable delay time, and when the voltage detecting circuit detects that the switch voltage at the switch node has a second polarity, the delay time adjusting circuit prolongs the adjustable delay time.

3. The circuit according to claim 2, wherein:

the first polarity indicates that the switch voltage at the switch node is larger than zero, and the second polarity indicates that the switch voltage at the switch node is smaller than zero.

4. The circuit according to claim 1, wherein:

the current detecting circuit comprises:

a resistor coupled in series between the second switch and a ground potential;

a reference voltage source for being a representative of the predetermined threshold current; and a second comparator having a non-inverting input terminal and an inverting input terminal, the non-inverting input terminal being coupled to a connecting point between the resistor and the second switch, and the inverting input terminal being coupled through the reference voltage source to the ground potential.

5. The circuit according to claim 1, wherein:

the delay time adjusting circuit comprises:

an adjustable delay circuit for receiving the original prevention signal, and outputting the corrected prevention signal after the adjustable delay time;

an up/down counter for applying a count signal to the adjustable delay circuit so as to determine the adjustable delay time; and an up/down determining circuit for applying an up/down signal to the up/down counter to increment/decrement the count signal on a basis of the switch voltage at the switch node detected by the voltage detecting circuit.

6. The circuit according to claim 5, wherein:
the delay time adjusting circuit further comprises:
a pulse generator for being triggered by the corrected prevention signal to generate a pulse signal, which is applied to the up/down determining circuit for allowing the up/down determining circuit to retrieve the switch voltage at the switch node detected by the voltage detecting circuit.

7. The circuit according to claim 5, wherein:
when the switch voltage at the switch node has a first polarity, the up/down determining circuit applies the up/down signal to the up/down counter for incrementing the counter signal, and
when the switch voltage at the switch node has a second polarity, the up/down determining circuit applies the up/down signal to the up/down counter for decrementing the counter signal.

8. The circuit according to claim 7, wherein:
the first polarity indicates that the switch voltage at the switch node is larger than zero, and
the second polarity indicates that the switch voltage at the switch node is smaller than zero.

9. A reverse current preventing method, applied in a synchronous switching voltage converter having a first switch, a second switch, and an inductor, three of which are coupled together to a switch node, such that an inductor current flowing through the inductor increases when the first switch is turned ON and the second switch is turned OFF, and the inductor current decreases when the first switch is turned OFF and the second switch is turned ON, the reverse current preventing method comprising:
detecting the inductor current;
generating an original prevention signal when the inductor current reduces to reach a predetermined threshold current;
detecting a switch voltage at the switch node, wherein the step of detecting the switch voltage at the switch node is implemented by a first comparator and an enabling circuit, and the first comparator is controlled by the enabling circuit such that the first comparator is disabled when the first switch is turned ON but is enabled when the first switch is turned OFF;
generating a corrected prevention signal in response to the original prevention signal, such that the corrected prevention signal is output after an adjustable delay time with respect to the original prevention signal;
adjusting the adjustable delay time on a basis of the switch voltage at the switch node; and
turning OFF the second switch of the synchronous switching voltage converter in response to the corrected prevention signal.

10. The method according to claim 9, wherein:
in the step of adjusting the adjustable delay time on a basis of the switch voltage at the switch node,
when the switch voltage at the switch node has a first polarity, the adjustable delay time is shortened, and
when the switch voltage at the switch node has a second polarity, the adjustable delay time is prolonged.

11. The method according to claim 10, wherein:
the first polarity indicates that the switch voltage at the switch node is larger than zero, and
the second polarity indicates that the switch voltage at the switch node is smaller than zero.

12. The method according to claim 9, wherein:
the step of detecting the inductor current is implemented by a current detecting circuit comprising:
a resistor coupled in series between the second switch and a ground potential;
a reference voltage source for being a representative of the predetermined threshold current; and
a second comparator having a non-inverting input terminal and an inverting input terminal, the non-inverting input terminal being coupled to a connecting point between the resistor and the second switch, and the inverting input terminal being coupled through the reference voltage source to the ground potential.

13. The method according to claim 9, wherein:
the adjustable delay time is provided by a delay time adjusting circuit comprising:
an adjustable delay circuit for receiving the original prevention signal, and outputting the corrected prevention signal after the adjustable delay time;
an up/down counter for applying a count signal to the adjustable delay circuit so as to determine the adjustable delay time; and
an up/down determining circuit for applying an up/down signal to the up/down counter to increment/decrement the count signal on a basis of the switch voltage at the switch node detected by the voltage detecting circuit.

14. The method according to claim 13, wherein:
the delay time adjusting circuit further comprises:
a pulse generator for being triggered by the corrected prevention signal to generate a pulse signal, which is applied to the up/down determining circuit for allowing the up/down determining circuit to retrieve the switch voltage at the switch node detected by the voltage detecting circuit.

15. The method according to claim 13, wherein:
when the switch voltage at the switch node has a first polarity, the up/down determining circuit applies the up/down signal to the up/down counter for incrementing the counter signal, and
when the switch voltage at the switch node has a second polarity, the up/down determining circuit applies the up/down signal to the up/down counter for decrementing the counter signal.

16. The method according to claim 15, wherein:
the first polarity indicates that the switch voltage at the switch node is larger than zero, and
the second polarity indicates that the switch voltage at the switch node is smaller than zero.

* * * * *